United States Patent
Gneuss et al.

(10) Patent No.: US 12,128,599 B2
(45) Date of Patent: Oct. 29, 2024

(54) DEGASSING EXTRUDER HAVING A MULTI-SCREW UNIT AND METHOD FOR DEGASSING POLYMER MELTS THEREWITH

(71) Applicant: GNEUSS GmbH, Bad Oeynhausen (DE)

(72) Inventors: Stephan Gneuss, Bad Oeynhausen (DE); Daniel Gneuss, Charlotte, NC (US); Detlef Gneuss, Carabietta Tessin (CH)

(73) Assignee: Gneuss GmbH, Bad Oeynhausen (DE)

( * ) Notice: Subject to any disclaimer, the term of this patent is extended or adjusted under 35 U.S.C. 154(b) by 797 days.

(21) Appl. No.: 17/322,511

(22) Filed: May 17, 2021

(65) Prior Publication Data

US 2021/0283817 A1    Sep. 16, 2021

Related U.S. Application Data

(63) Continuation of application No. PCT/EP2019/081697, filed on Nov. 18, 2019.

(30) Foreign Application Priority Data

Nov. 16, 2018 (DE) .......................... 102018128884.0
Oct. 15, 2019 (DE) .......................... 102019127884.9

(51) Int. Cl.
*B29C 48/76* (2019.01)
*B29C 48/43* (2019.01)
*B29C 48/44* (2019.01)

(52) U.S. Cl.
CPC ............ *B29C 48/767* (2019.02); *B29C 48/43* (2019.02); *B29C 48/44* (2019.02)

(58) Field of Classification Search
CPC ....... B29C 48/767; B29C 48/43; B29C 48/67; B29C 48/435; B29C 48/44; B29B 7/485; B29B 7/489; B29B 7/845
See application file for complete search history.

(56) References Cited

U.S. PATENT DOCUMENTS 7,513,677 B2    4/2009  Gneuss et al.
9,061,442 B2 *  6/2015  Gneuss ................ B29C 48/385
(Continued)

FOREIGN PATENT DOCUMENTS

CN    1775506 A    5/2006
CN    101293397 A   10/2008
(Continued)

OTHER PUBLICATIONS

International Search Report dated Feb. 14, 2020 in corresponding application PCT/EP2019/081697.

*Primary Examiner* — Charles Cooley
(74) *Attorney, Agent, or Firm* — Muncy, Geissler, Olds & Lowe, P.C.

(57) ABSTRACT

A degassing extruder having a multi-screw unit, which degassing extruder comprises a housing having a feed region having a feed opening, an inner housing recess having an extraction opening extending as far as the outside and an outlet region having an outlet opening. The multi-screw unit rotatably arranged in the housing recess comprises: a rotor element having a main screw web extending over the outer circumference of a rotor shaft core, and a rotationally driven satellite screw, which is mounted in a receiving groove on the rotor element, which receiving groove extends at least along part of the length of the multi-screw unit. At least in the region of the extraction opening, the main screw web above the receiving groove has an respective opening recess for leading the satellite screw through.

12 Claims, 7 Drawing Sheets

(56) References Cited

U.S. PATENT DOCUMENTS

| | | | |
|---|---|---|---|
| 10,124,513 B2 | 11/2018 | Clark | |
| 10,493,660 B2 | 12/2019 | Clark | |
| 10,906,215 B2 | 2/2021 | Gneuss et al. | |
| 2020/0282369 A1* | 9/2020 | Gneuss | B01F 27/726 |
| 2021/0283817 A1* | 9/2021 | Gneuss | B29C 48/67 |
| 2022/0355526 A1* | 11/2022 | Clark | B29B 17/02 |
| 2022/0356321 A1* | 11/2022 | Clark | B29C 48/525 |
| 2023/0278261 A1* | 9/2023 | Gneuss | B29C 48/2526 |
| | | | 366/84 |
| 2023/0278273 A1* | 9/2023 | Gneuss | B29B 7/488 |
| | | | 425/376.1 |
| 2023/0286200 A1* | 9/2023 | Gneuss | B29C 48/2522 |

FOREIGN PATENT DOCUMENTS

| | | | |
|---|---|---|---|
| CN | 101837633 A | 9/2010 | |
| DE | 102013003380 B3 | 4/2014 | |
| WO | WO03033240 A1 | 4/2003 | |
| WO | WO2013180941 A1 | 12/2013 | |
| WO | WO2014183984 A1 | 11/2014 | |
| WO | WO2016081474 A1 | 5/2016 | |

* cited by examiner

DEGASSING EXTRUDER HAVING A MULTI-SCREW UNIT AND METHOD FOR DEGASSING POLYMER MELTS THEREWITH

This nonprovisional application is a continuation of International Application No. PCT/EP2019/081697, which was filed on Nov. 18, 2019 and which claims priority to German Patent Application No. 10 2018 128 884.0, which was filed in Germany on Nov. 16, 2018 and to German Patent Application No. 10 2019 127 884.9, which was filed in Germany on Oct. 15, 2019, which are all herein incorporated by reference.

BACKGROUND OF THE INVENTION

Field of the Invention

The present invention relates to a degassing extruder having a multi-screw unit and to a method for degassing a polymer melt therewith.

Description of the Background Art

When processing polycondensates, such as in particular polyester, it is important to continuously discharge the cleavage product—usually water—in order to increase or at least maintain the polymer chain length and to prevent further degradation of the molten polymer. This is important precisely in the case of demanding manufacturing techniques, such as the production of fine spun fibers, which require a high polymer quality and in particular a high intrinsic viscosity.

WO 2013 180 941 A1 describes a method for producing bulk continuous carpet filament (BCF carpet) from recycled polyester. Said document provides that a stream of molten polymer is subdivided into at least two individual streams. The individual streams should be degassed separately from one another by applying and maintaining a vacuum in separate extruders before they are combined again to form an overall melt stream, which should then be fed directly to a downstream spinning device. The subdivision into a plurality of individual streams which are processed in extruders arranged in parallel, however, leads to a high outlay in terms of equipment with respect to costs, space requirement, synchronization, etc. To carry out the method, as an exemplary embodiment, a multiple-shaft extruder is furthermore specified which is intended to reproduce the function of the plurality of separate extruders in a single structural unit and to degas the separated melt streams independently of one another before they are recombined. For this purpose, a multi-rotation unit rotates about a central shaft in which a plurality of satellite screws are rotatably mounted. For the purpose of degassing, a housing is provided which has an opening connected to a vacuum pump. The subdivision into partial melt streams which are separate from one another has the advantage with respect to a single stream that the polymer surface at which a gas exchange can take place is enlarged. The degassing of the individual melt streams, which are conducted over the satellite screws, can however only take place in the brief moment in which the respective satellite screw with its partial melt stream is guided past the opening in the housing during the rotation of the multi-screw unit. It remains to be seen how the permanent maintenance of a constant low pressure for the purpose of degassing is to be maintained in each partial melt stream, although the associated satellite screw is only ever moved briefly through the opening of the housing and then for the rest of the revolution is outside the area of influence of the vacuum.

WO2003/033240 A1 describes an MRS system which comprises a plurality of satellite screws. This brings about a significant enlargement of the surface of the polymer melt and significantly improves the melt quality. Transverse flows across the rotor element, from one satellite screw to the next, are possible and desirable. The major part of the conveyance of the polymer melt is imposed on the satellite screws, while an only weakly pronounced screw flight on the rotor element has a smaller proportion of the flow that primarily serves to surround the rotor element with melt and thus to bring about a lubrication in the housing.

CN 101293397 A [D1] and CN 101837633 A [D2] each describe a multi-screw unit in which the satellite screws lie completely within the screw channel of the main screw flight on the central rotor element. Therefore, said satellite screws convey the polymer melt parallel to the core of the rotor element in the longitudinal direction via their flights. Because the satellite screws extend with their entire cross section through the main screw flights, not only is the melt conveyed along the main screw flight, but partial streams arise which bridge the main screw. This counteracts the swirling which is conducive to degassing and a long residence time in the region of the suction opening.

CN 1775506 A [D3] discloses a multi-screw unit described which is not intended for degassing. The satellite screws are enclosed in each case with a predominant part of their overall cross section by the walls of a receiving groove on the central rotor element. The screw helices on the satellite screws have a very low flight height.

SUMMARY OF THE INVENTION

It is therefore an object of the present invention to provide a degassing extruder by means of which the quality of the polymer melt processed therein can be increased. In particular, as a prerequisite for this, a large polymer surface should be created and/or a high surface exchange in the polymer melt should be brought about when the polymer melt passes the suction opening or else already before it.

The approach according to the invention is exactly contrary to the prior art described above in the form of what is known as the multi-rotation system and is differentiated from it already in terms of the terminology. The multi-screw unit according to the invention can also be referred to as a 'degassing single-rotor extruder', since the conveying action is achieved very much by the channels incised in the central (single-) rotor element and since the satellite screws improve the degassing effect, without conveying independently.

The conveying action is performed quite predominantly by at least one main screw flight, which is formed on the outer side of the rotor element. The main screw flight is formed high enough above a shaft core of the rotor element or the channels formed between the flights are incised deeply enough that a conveying action is provided by the main screw flight alone. On the other hand, the conveying action of the satellite screws significantly recedes or no longer has an appreciable proportion thereof. Instead, the satellite screws serve to circulate, break up and mix the polymer melt. This is due to the fact that the satellite screws are mounted as deeply as possible in the rotor shaft, with the result that the conveying action thereof is largely eliminated or significantly reduced.

The advantages achieved by the invention include, amongst other things, better mixing and better degassing. Furthermore, the shearing of the polymer is reduced. The reduction in the mechanical shearing leads to an improved melt quality even alone. Moreover, with a lower degree of shearing, the introduction of heat into the melt is reduced; overheating is avoided.

The fact that the satellite screw protrudes with a large proportion of its lateral surface from the rotor element correspondingly enlarges the surface of the main screw. A larger surface results in diffusion into the surface to a greater extent and improves the degassing action.

The height of the main screw flight can be greater than the maximum channel depth of the receiving grooves. The height of the main screw flight is preferably at least as high as the height of the screw flight on the satellites, in particular at least twice as high.

The direction of rotation of the satellite elements with the screws is preferably counter to that of the rotor element with its main flight and the orientation of the satellite screw flights is inverse to the orientation of the main screw flight. Insofar as the satellite screws still have a conveying action at all, it is directed axially in the same direction as the conveyance through the main screw flight. Nevertheless, within the channels of the main screw an opposite relative movement between the rotor element and the respective satellite screw is produced, thereby improving the breaking-up of the conveyed melt and consequently the degassing thereof. Design advantages are that the satellite screws can be provided at the ends with pinions, which are in direct engagement with a toothed ring formed on or fastened to the rotor element.

Where the satellite screws pass through the main screw flights, they are enclosed preferably up to an extent of at least 70% of the circumference. This means that only small flows can pass along the rotor element through the remaining free spaces between the main screw flight and the satellite screw. The conveying action of the main screw flight is retained. In the length region between adjacent parts of the main screw flight the satellite screws are by contrast enclosed by the receiving groove in which they are arranged to a considerably smaller extent and are at least half open. As a result, said satellite screws no longer form a conveying element as in an extruder, but are primarily mixing elements for the polymer melt.

In the context of the present invention, the 'degree of enclosure' can refer to the ratio of that portion of the circumference of the satellite mixing element which is shielded by walls of the rotor element and its main screw flight to the total circumference.

With its large diameter and circumference, over which at least one almost uninterrupted main screw flight runs, the rotor element offers a large surface on which the melt stream is diffused. This is conducive to the degassing of the polymer melt, for example, if it is guided along a housing suction opening to which a vacuum is applied. On the other hand, the screw channels located between the adjacent parts of the main screw flight conduct a uniform melt stream with them instead of many individual melt streams. Owing to the rotation of the rotor element, the uniform melt stream is guided repeatedly in a targeted manner past the housing suction opening at which the vacuum is applied. In particular, there is thus a defined residence time in the area of influence of the vacuum.

According to the invention, as already mentioned, the satellite screws do not serve to convey individual melt streams, but rather lie recessed within the screw channel of the rotor element, wherein they open into the main screw channel to such an extent that they bring about a circulation of those portions of the melt which are located at the bottom in the foot of the screw channel in the main screw flight. The satellite screws thus cause individual parts of an otherwise uniform melt stream which runs through the channel of the main screw to break up, mix and change location, and ensure that the degassing action by the vacuum is constant for the entire melt stream conveyed via the rotor element and not only for the proportions located right on the outside.

Even a single satellite screw improves the mixing and surface enlargement of the polymer melt. It is preferably the case that at least three satellite screws are arranged at a uniform angular distribution on the rotor element. The following considerations apply to the selection of the number of satellite screws: of the degassing extruder is used primarily to mix a plurality of components or to homogenize one component, the mixing action can be enhanced by increasing the number of satellite screws, and/or if the focus is on the degassing, the result is that the mixing action influences the degassing efficiency. With an increased number of satellite screws, the required partial pressure in the degassing space can be increased, that is to say the pressure in the area of influence of the vacuum can be increased.

For a given application, the number of satellite screws is thus determined and, by virtue of a simple test, the desired optimum pressure range for the procedure is arrived at by applying a pressure of, for example, less than 0.1 mbar to over 1 bar step by step and the product treated in this way being analyzed for several test stages.

The cross-sectional area in the main screw channel is selected in comparison with a nominal volumetric flow for the degassing extruder such that the cross section is not completely filled during normal operation. On account of the low fill level, the suction action of the vacuum can indirectly also extend to all those circumferential regions on the rotor element which are currently not located directly in the region of the housing opening.

It is essential to the invention that the main screw flight respectively has only an opening which is as small as possible at that point at which the satellite screws pass through the main screw flight. The satellite screw is enclosed here with a greater proportion of its circumference by cross-sectional areas of the rotor element including the main screw flight than in the axial regions in between.

If the degree of enclosure of the satellite screw in the channels is 50% or less, that means that 180° of the circumference or more is exposed. In that case, a form-fitting guidance of the satellite screw in the receiving grooves is not provided in these zones, with the result that the enclosure of the satellite screw that is additionally provided by the main screw flight should be large enough that there, more than 180° of the circumference is enclosed, that is to say the degree of enclosure is more than 50%. In that case, the guidance is effected necessarily through a sufficiently large enclosure in the region of the main screw flight. Surprisingly, in terms of mechanical engineering, the guidance through the relatively short flight portions is sufficient.

The enclosure of the satellite screws must either be greater than 50% in the receiving groove or, if this is not possible, at least more than 50% when passing through the main screw flight. In the axial course of the satellite screws, the degree of enclosure should preferably be more than 70% at least at one point. Together with the drive pinion, which is usually attached to the rear end, at least two mounting points for the form-fitting guidance of the satellite screw are thus produced.

A degree of enclosure at those points at which the satellite screws each pass through the main screw flight that is as great as possible is also advantageous because a small opening recess in the main screw flight maintains the conveying action of the main screw flight, that is to say the melt cannot form any significant transverse flows in the case of small opening recesses and must rather inevitably follow the course of the main screw flight. In the process, said melt is guided past the housing opening repeatedly and the degassing effect is improved.

In the case of the degassing extruder according to the invention, the following parameters should be coordinated: external diameter of the rotor element, measured at the top edge of the main screw flight; height of the main screw flight above the rotor core; width of the main screw flight; diameter of the pitch circle on the rotor element on which the at least one satellite screw is arranged, and diameter of the satellite screws and height of the satellite screw flights thereof.

The result of this is the opening width or the opening angle of the opening recess in the main screw flight.

In the case of multi-screw units with small nominal diameters and a correspondingly small number of 3 to 5 satellite screws, provision is preferably made for the core of the satellite screw, that is to say its central cross-sectional part without the external satellite screw flight, to be positioned completely or almost completely within the circumferential line of the rotor core. This relationship means that the height of the satellite screw flights is approximately of the same magnitude as the height of the main screw flight and that the satellite screws do not restrict the conveying volume in the main screw flight.

The sum of the diameter of the pitch circle and the diameter of the satellite screw flights must not be greater than the external diameter of the rotor element. This means that the flights of the satellite screws never protrude radially beyond the top edge of the main screw flight. As a result, the gap between the outer edge of the main screw flight and the housing recess can be kept very small.

On the other hand, the pitch circle and diameter of the satellite screws must be selected such that the satellite screw flights even protrude sufficiently beyond the base of the screw channels in the main screw flight in order to be able to achieve their breaking-up action.

A coordination is preferably provided in such a way that the satellite screws, outside of those points at which they are passed through the main screw flight, are enclosed with at least 40% and at most 70% of their circumference by the flanks of the receiving groove and are otherwise, outside of this, free in the screw channel.

It is difficult that the satellite screws are no longer well guided through the enclosure in the receiving grooves in the rotor element as the channel depth increases. The degree of enclosure at the receiving grooves quickly drops below 60% if the pitch circle diameter is larger than the diameter of the rotor core. This is necessary in particular in the case of larger rotor diameters because the size of the satellite screws and the height of the flight thereof are limited and are not increased proportionally to the diameter of the rotor core.

In summary, the following geometric requirements arise with regard to the enclosure of the satellite screws according to the invention:

Within the channels between the main screw flights, the enclosure by the receiving grooves should be less than 50%, in order that the satellite screws no longer display any substantial conveying action and instead a better melt exchange is achieved over the circumference of the rotor.

Within the passage through the main screw flight, the enclosure should be as large as possible in order to prevent conveyance in the longitudinal direction that is not brought about by the main screw flight. However, the degree of enclosure at the main screw flight must in any case be greater than in the open regions of the channels.

Either in the open regions in the channel or else in the passage through the main screw flight, a degree of enclosure of more than 50%, in particular at least 60%, must be achieved at least at one point in order to bring about a form-fitting mechanical guidance of the satellite screws in the rotor element.

In addition to these geometric relationships relating to the cross section, the following applies to the consideration of the guidance of the screws on the rotor unit over the length: the enclosure is effected by the rotor shaft core over more than 70% of the length of that length of the rotor element which is active for the degassing and the enclosure is effected by the flights over more than 5% but less than 20% of the length.

If the distribution of flight width to channel width is considered, the ratio should be at most 1:4 and should if anything be smaller, that is to say the flight widths take up 20% of the pitch of the screw or less, in order to have as much conveying volume as possible for the conveyance and degassing of the melt and for said conveying volume to be filled as little as possible by the main screw flight.

When using the degassing extruder according to the invention for processing a polymer melt, at least the following method steps are provided: feeding a melt stream to the rotor element which is rotatably arranged in the housing recess and which comprises a plurality of rotatable satellite screws on the circumference; the drive is effected via an internal toothing in the housing recess, with which the likewise toothed ends of the satellite screws are in direct or indirect engagement; surface-area distribution of the melt stream on the circumference of the rotor element and on the satellite screws by rotating the rotor element with respect to the housing; discharging the polymer melt from the rotor element and from the satellite screws to at least one outlet channel.

In the process, the polymer melt distributed on the rotor element is conveyed over the length of the rotor element by means of at least one main screw flight arranged on the outer circumference of the rotor element and loosened up by the at least one satellite screw from the base of the channel. If a plurality of satellite screws are present, the polymer melt is exchanged between the adjacent satellite screws at the same time as a result.

It is advantageous in the method if the volumetric flow of the polymer melt fed to the multi-screw unit and the volumetric flow discharged therefrom are coordinated with one another in such a way that the conveying volume enclosed between the adjacent portions of the main screw flight, the outer side of the rotor element and the inner side of the housing recess, or the conveying cross section, considered in the longitudinal section of the rotor element, is filled to an extent of less than 100% with polymer melt, in particular to an extent of less than 80%. The reduction in what is known as the fill level means that a lot of free space is available to swirl the polymer melt through the satellite screws, to enlarge the surface and to intensify the mixing of adjacent proportions of the melt stream.

The processing method using a degassing extruder according to the invention makes it possible for in particular the following polymer melts to be processed: polyester for various fields of application, in particular also polyester in various fiber forms such as Bulk Continuous Filament (BCF), which is suitable for producing carpets. In this respect, the polyester treated in a degassing extruder according to the invention can be introduced directly into a spinning process; and polyamide.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
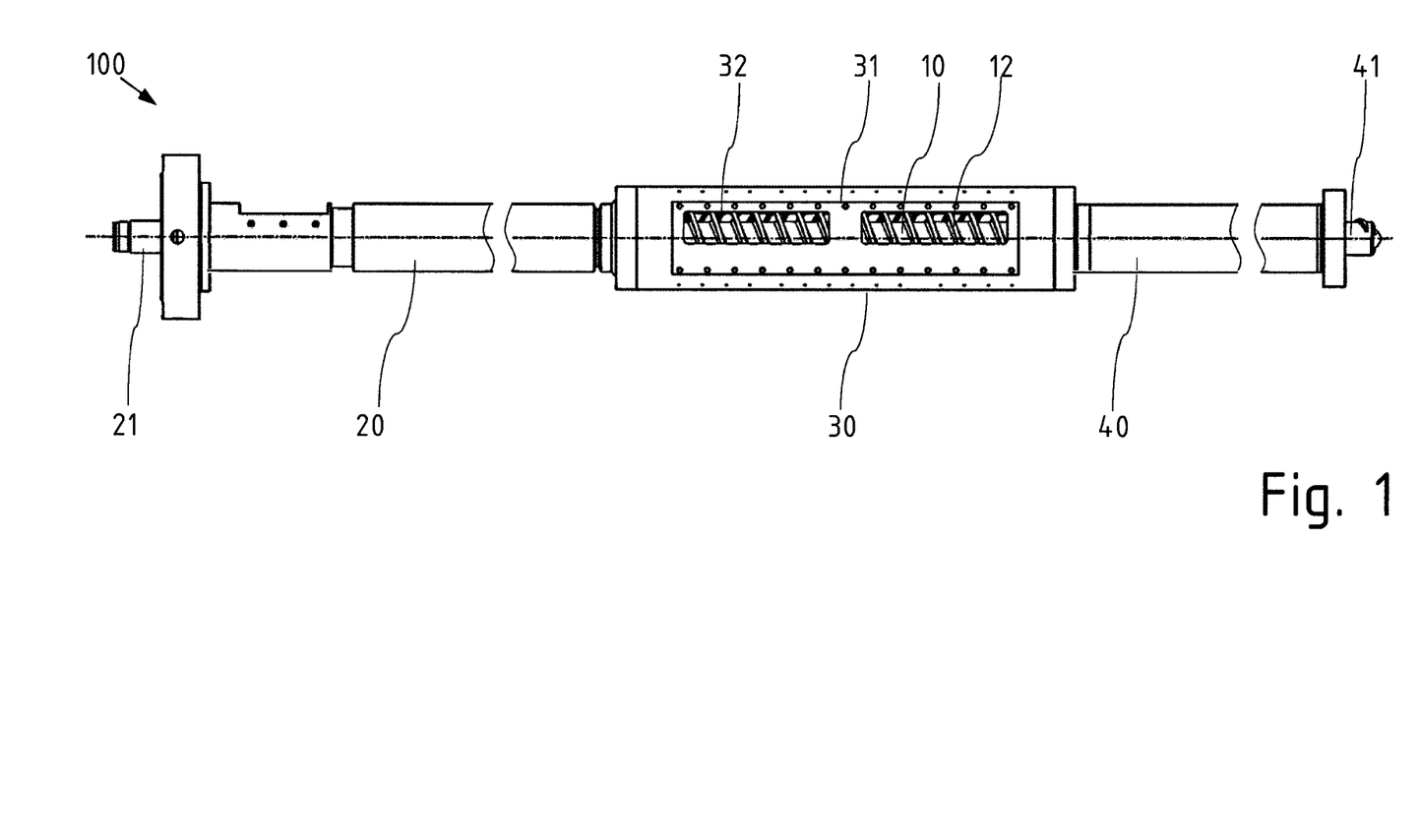
FIG. 1 shows a degassing extruder in a side view.

FIG. 1 illustrates a degassing extruder 100 in a side view. Said degassing extruder comprises an inlet region 20, which has a long form in the exemplary embodiment illustrated, laterally alongside a housing 30. Said inlet region comprises a rotating screw shaft 21 in an internal inlet channel. Furthermore, on the other side of the housing 30, there follows an outlet region 40 with an internal outlet channel in which a rotating screw shaft 41 is likewise arranged. The housing 30 is illustrated in FIG. 1 as seen from that side which has two housing openings 32 next to one another which are arranged within a common flange area 31, to which in turn a vacuum suction line can be attached. Parts of a multi-screw unit 10 can be seen in the interior through the housing openings 32, shown in particular being the channel depth or flight height, enlarged to a quite substantial extent in comparison with the prior art, of a main screw flight 12, which extends over the outer circumference of a rotor element 11.

Figure 2:
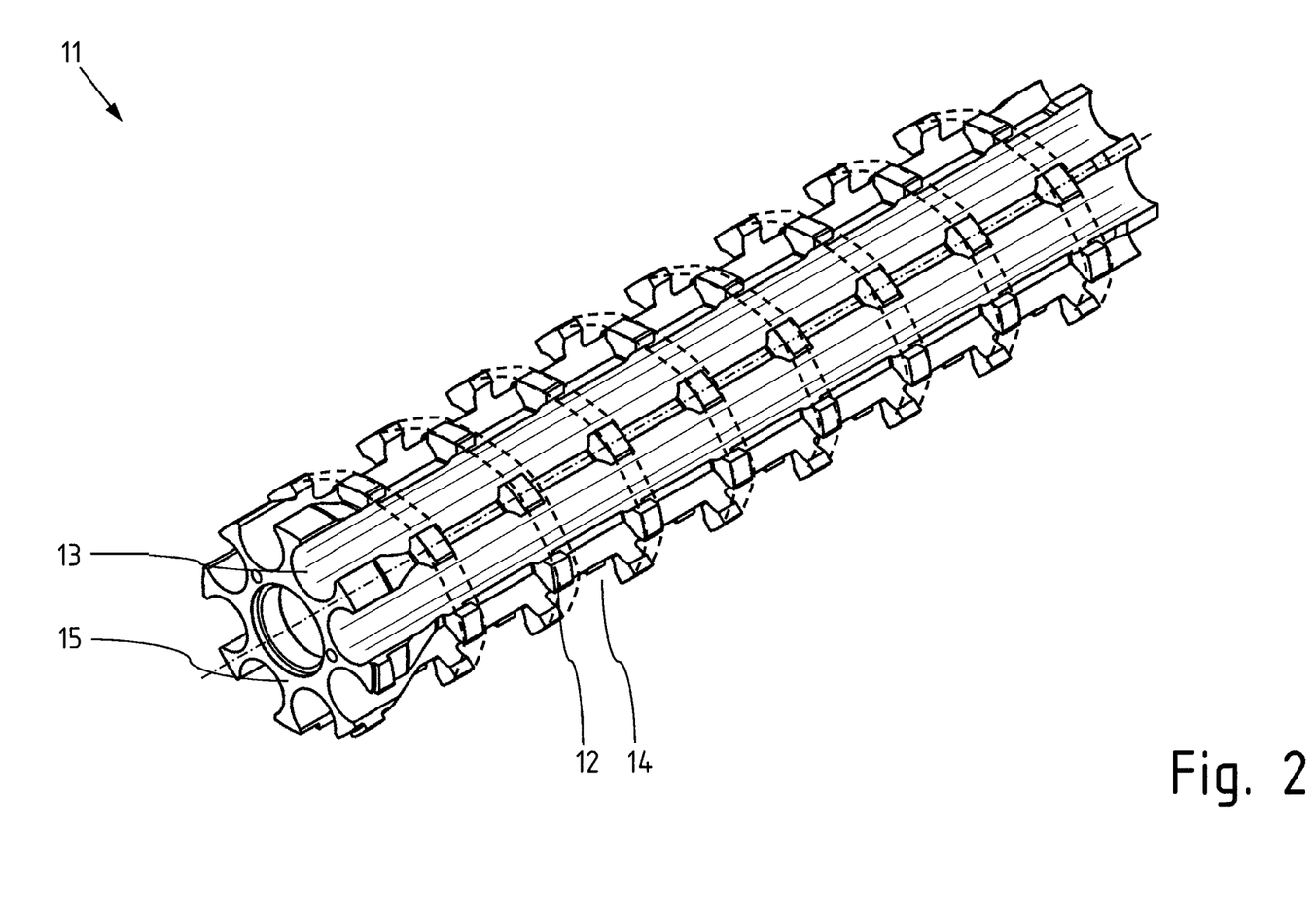
FIG. 2 shows a rotor element in a perspective view.

FIG. 2 illustrates the rotor element 11 in a perspective view. A shaft core 15 is surrounded on its outer circumference by the main screw flight 12. Moreover, in total eight receiving grooves 13 for satellite screws that are arranged offset by 45° to one another in each case are formed on the outer circumference. It can already be seen in FIG. 2 that a relatively large channel depth is provided in the channel 14 formed in the main screw flight 12.

Figure 3:
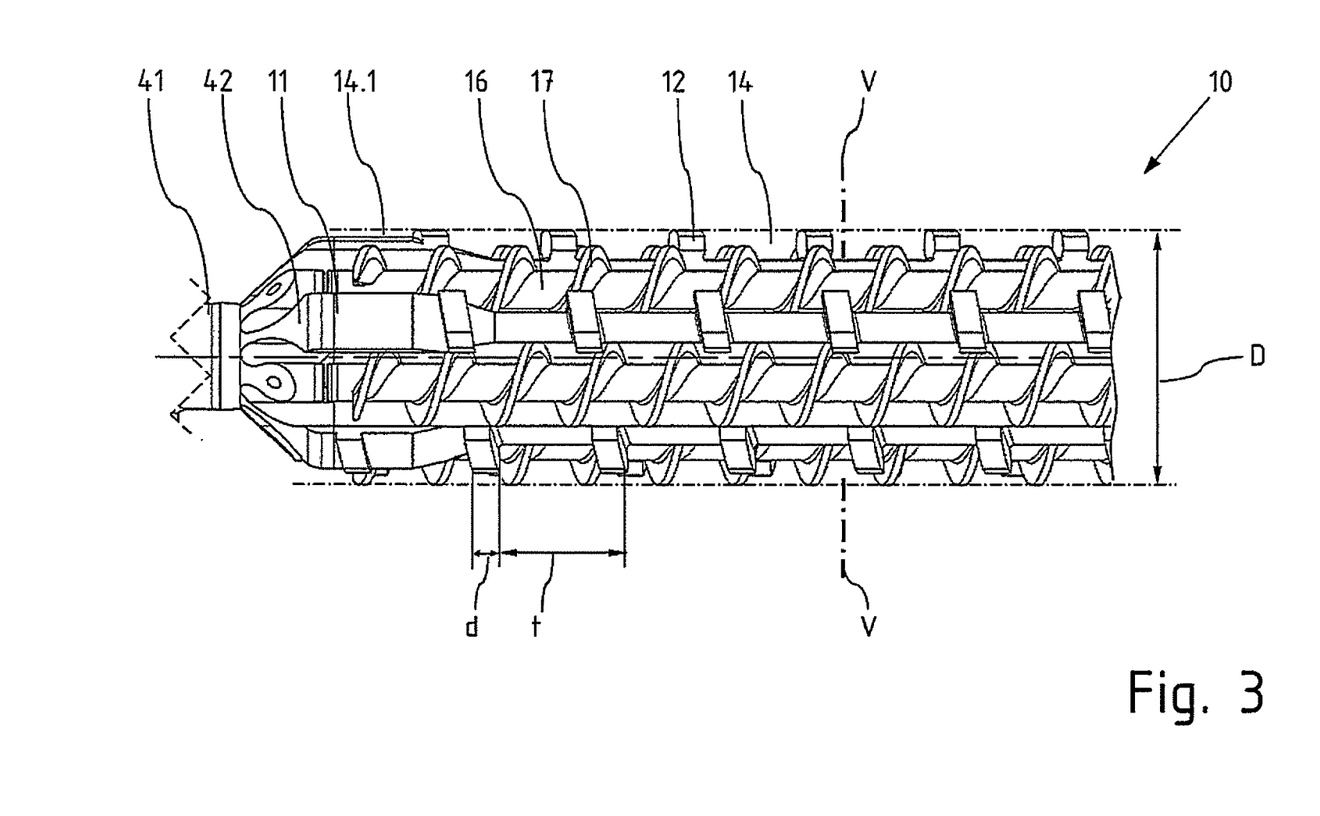
FIG. 3 shows a detail of a side view of a multi-screw unit.

This is also particularly clear in FIG. 3, which shows a detail of a side view of the multi-screw unit 10, specifically the end which is at the front in the flow direction and transitions into the discharge screw 41 at a transition cone 42. Only immediately in front of the transition cone 42 does the rotor element 11 have a channel 14.1 with a small depth. In the other areas to the right of this, the channel 14 is incised significantly deeper, the channel depth being measured radially from the outer circumference of the main screw flight 12 to the outer circumference of the shaft core 15.

The diameter of the rotor element 11 is denoted by D; t denotes the pitch of the main screw flight 12, the pitch t generally being specified as a dimensionless number which indicates the relation of the axial spacing of the flight portions at the same angular position with respect to the diameter D. In that case, the channel pitch is the distance, measurable on the main screw flight, from one flight edge to the next, measured at the same angular position, and is calculated as the product of diameter D and pitch t. The width of the channels 14 is consequently determined as the difference between the channel pitch D*t and a flight width d.

According to this definition, a pitch of t=1 means that the axial spacing, measured at the same angular position on the circumference, from one screw-flight leading edge to the next screw-flight leading edge is exactly the same as the diameter. For the purpose of polymer degassing, t<D, in order that the residence time of the polymer melt is long and the action of gas suction can develop. Furthermore, it can be clearly seen in FIG. 3 that the main screw flight 12 has an orientation in the opposite direction to the satellite screw flights 17. The rotor element 11 and the satellite screws 16 rotate in opposite directions, since they are toothed and directly in engagement with one another.

The features of the invention, described in relation to the cross section, with regard to the degree of enclosure of the satellite screws 16 are significantly associated with further features which relate to the profile of the rotor element in the longitudinal direction that can be seen in FIG. 2. In the case of a multi-screw unit equipped with the multi-screw unit 10 of the invention, the increased enclosure of the cross section of the satellite screws 16 compared to the prior art leads to a self-cleaning effect, since the main screw flight 12 scrapes over the entire length and the entire circumference of the housing recess on the inner walls in the housing and thus eliminates any adhering polymer residues.

The degrees of enclosure of the satellite screws 16 provided according to the invention accordingly result in the interruptions in the main screw flight 12 being short enough that the self-cleaning effect mentioned is provided. This relationship is explained with reference to FIGS. 4 and 5.

Figure 5:
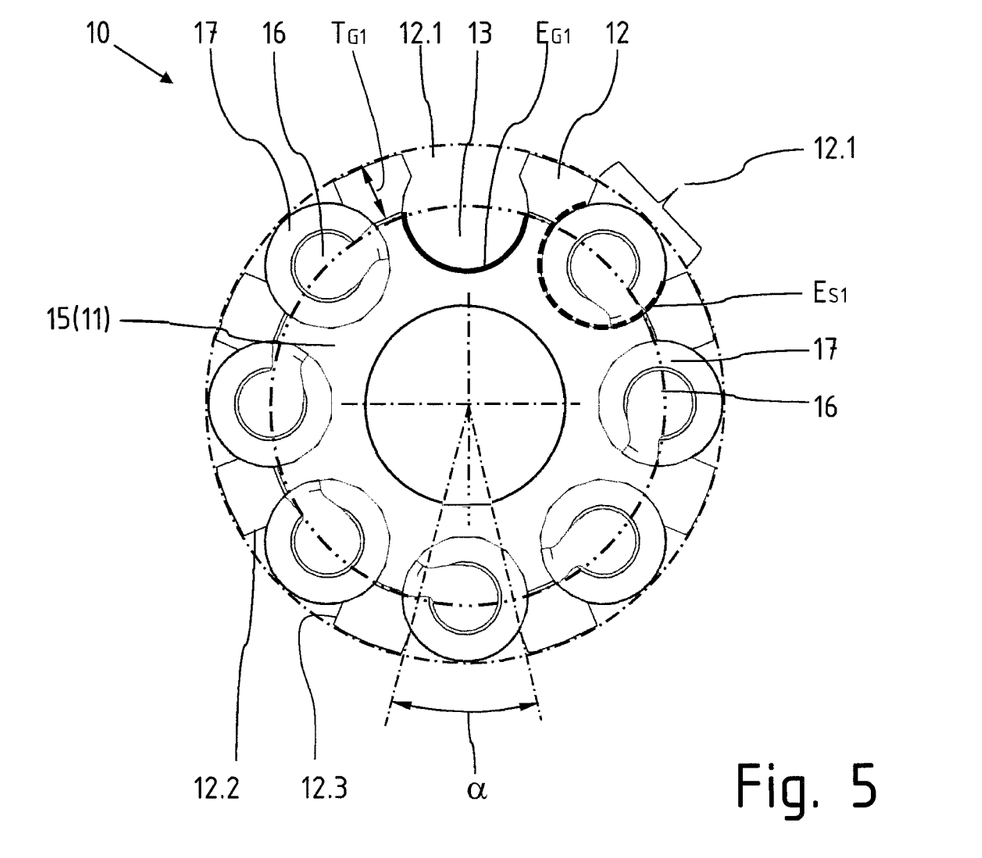
FIG. 5 shows the rotor element in section.

FIG. 5 shows a cross section of the rotor element 11. The main screw flight 12, which is interrupted for each of the eight receiving grooves 13, has a respective opening recess 12.1 above the receiving groove 13. The receiving groove 13 located at the top is illustrated as empty. The solid thick line characterizes the degree of enclosure of the satellite screws 16 within the channels 14, as in the axial regions between parallel portions of the main screw flight 12. The dashed line next to the receiving groove 13 on the right characterizes the degree of enclosure at the points where the satellite screws 16 pass through the main screw flight 12.

Figure 4:
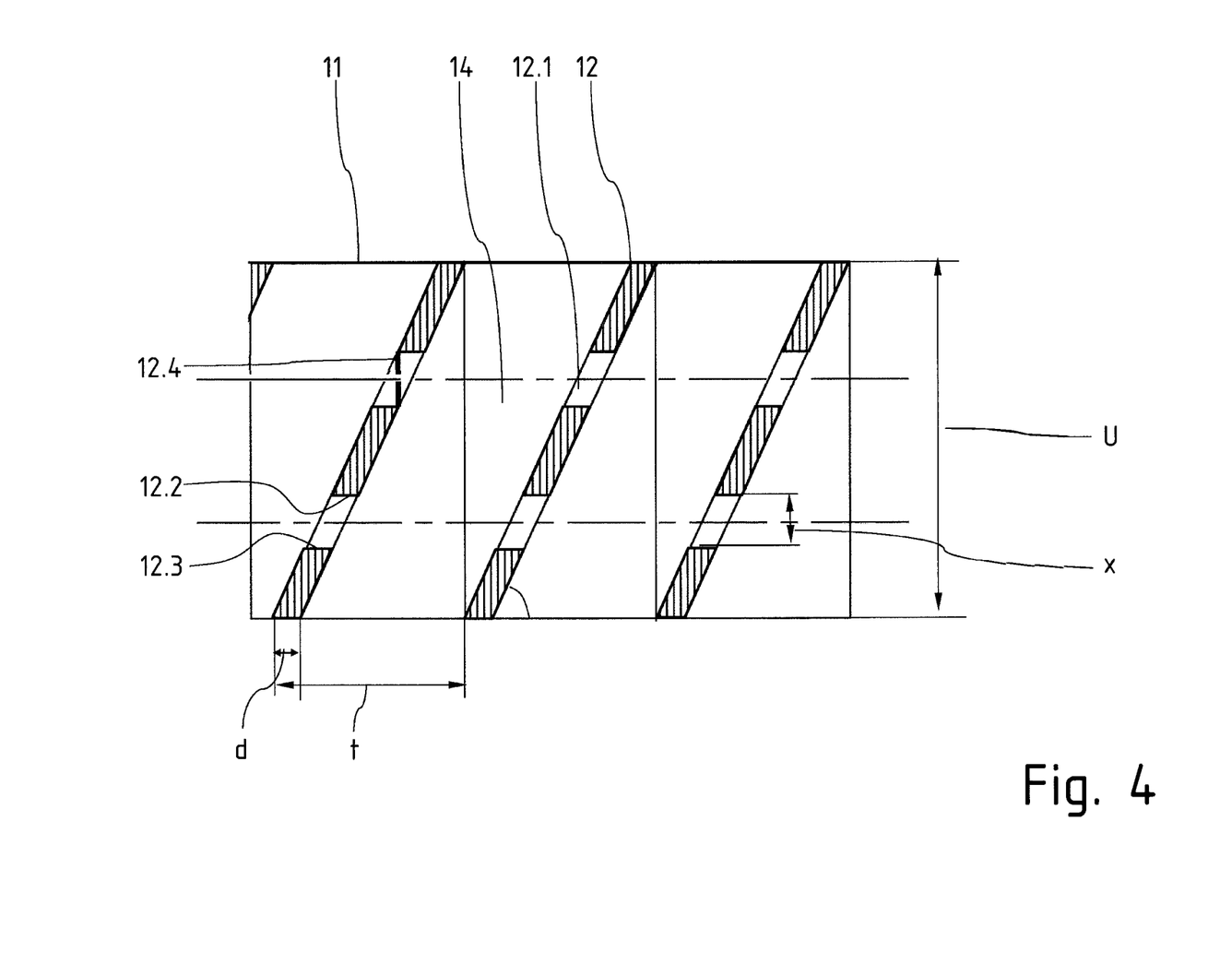
FIG. 4 shows a schematic developed view of the circumference of the rotor element.

FIG. 4 shows a schematic developed view of the outer circumference of the rotor element 11 with the main screw flight 12 and opening recesses 12.1 for a satellite screw. The bore diameter or the external diameter D of the main screw flight 12 are determined in advance from aspects such as the desired throughput of the extruder or the viscosity of the polymer to be processed. The external diameter D is therefore regarded as a constant for the further structural design of the multi-screw unit. From this, the length of the circumference is obtained:

$$U = D \cdot \pi$$

The opening width x of the opening recess 12.1 is determined by the opening angle α (cf. FIG. 5):

$$x = \alpha D/2$$

The functional requirement in terms of the self-cleaning action of the multi-screw unit 10 determines that there must be a slight overlap in the axial direction between the edges 12.2 and 12.3, which delimit the opening recess 12.1; this is labelled in FIG. 4 as the overlap zone 12.4.

For the mathematical determination, it applies that the edges 12.2, 12.3 must be at least axially at the same height in order that no axial gap is obtained, because in the event of a gap, it would not be possible to clean that region of the inner wall of the housing recess which is passed over by this portion of the rotor element.

This results in the following relationship for the flight width d of the main screw flight 12 in relation to the opening angle α (see FIG. 5) and to the pitch t:

$$d = \infty \cdot D \cdot t / 2\pi$$

The flight width d should be as small as possible in order that the conveying volume, determined by the flight width and flight height, of the channels 14 between the sections of the main screw flight 12 is as large as possible. As already stated above, the ratio of flight width d to channel width should be selected as follows:

$$d/D \cdot t - d \le 1/4$$

In relation to the pitch t, the following is obtained for the flight width d:

$$d \le D \cdot t / 5$$

Based on the flight width limitation of 20% of the pitch mentioned above, the following is obtained for the opening angle α:

$$\infty \le 2\pi/5$$

Further relationships for the multi-screw unit 10 according to the invention are obtained from the sectional views in the following figures.

The multi-screw unit 10 is illustrated in cross-section in FIG. 5, specifically in the region of the line V-V in FIG. 3. A pitch circle 19, which predefines the position of the centers of receiving grooves 13 and satellite screws 16, has a diameter which is approximately as large as the diameter of the shaft core 15 of the rotor element 11. Part of the core cross section of the satellite screws 16 protrudes respectively beyond the circumferential line of the rotor shaft core 15. This is necessary in order, on the one hand, to keep the size of the satellite screws 16 limited in order that they do not develop any significant conveying action, and, on the other hand, to allow the satellite screw flights 17 to reach to the outer edge of the main screw flight 12 or at least to the vicinity thereof. Such a wide radial extent of the satellite screw flights 17 outward is selected in order that the proportions of the openings in the main screw flight that are not covered again by the projected cross-sectional area of the satellite screws including their flights 17 remain small. The resulting degree of enclosure EG1 of the satellite screws 16 in the channel is shown by a solidly drawn, arcuate line. In this example it is less than 50%. The channel depth of the channel 14 in the main screw flight 12 is denoted by TG1. At the same time, it can be seen in FIG. 4 that the proportion of the opening in the main screw flight 12 that is not covered again by the projected surface of the satellite screw 16 remains small.

Figure 6:
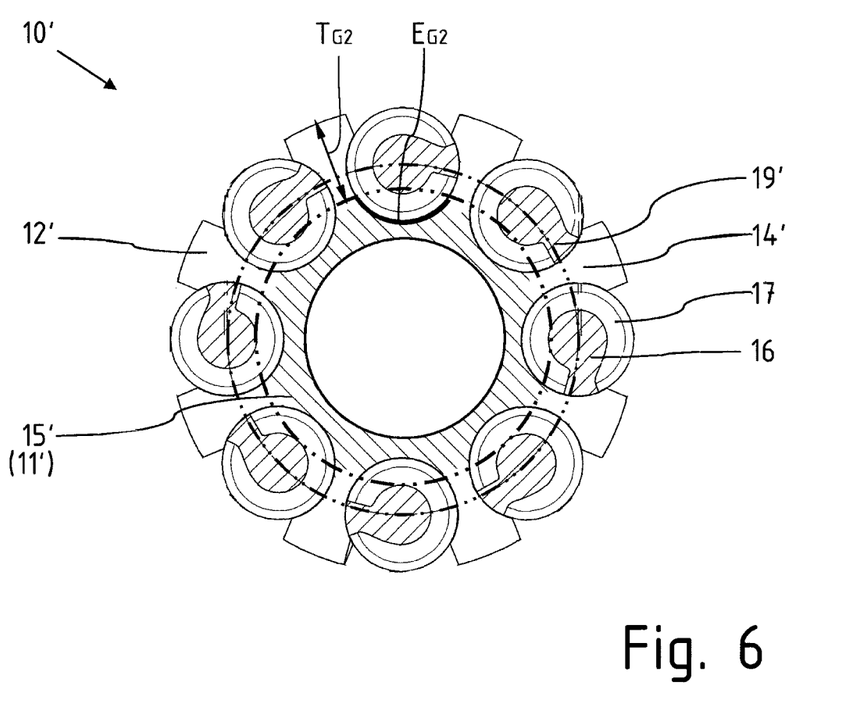
FIG. 6 shows the rotor element of a third embodiment in section.

FIG. 6 shows a very similar illustration of a multi-screw unit 10' to that in FIG. 5. The external diameter of the main screw flight 12', the external diameter of the satellite screws 16' and the pitch circle 19', on which receiving grooves 13' and satellite screws 16' are arranged, are each identical, for example according to FIG. 5. What is different in comparison to this is that the channel 14' formed in the main screw flight 12' has a greater channel depth TG2>TG1, which consequently lowers the diameter of the rotor shaft core 15'. The degree of enclosure EG2 in the channel 14' that is characterized by the boldly drawn arcuate line is thus likewise smaller, whereas the degree of enclosure ES2 of the satellite screw 16' remains constant as it passes through the main screw flight 12'.

Figure 7:
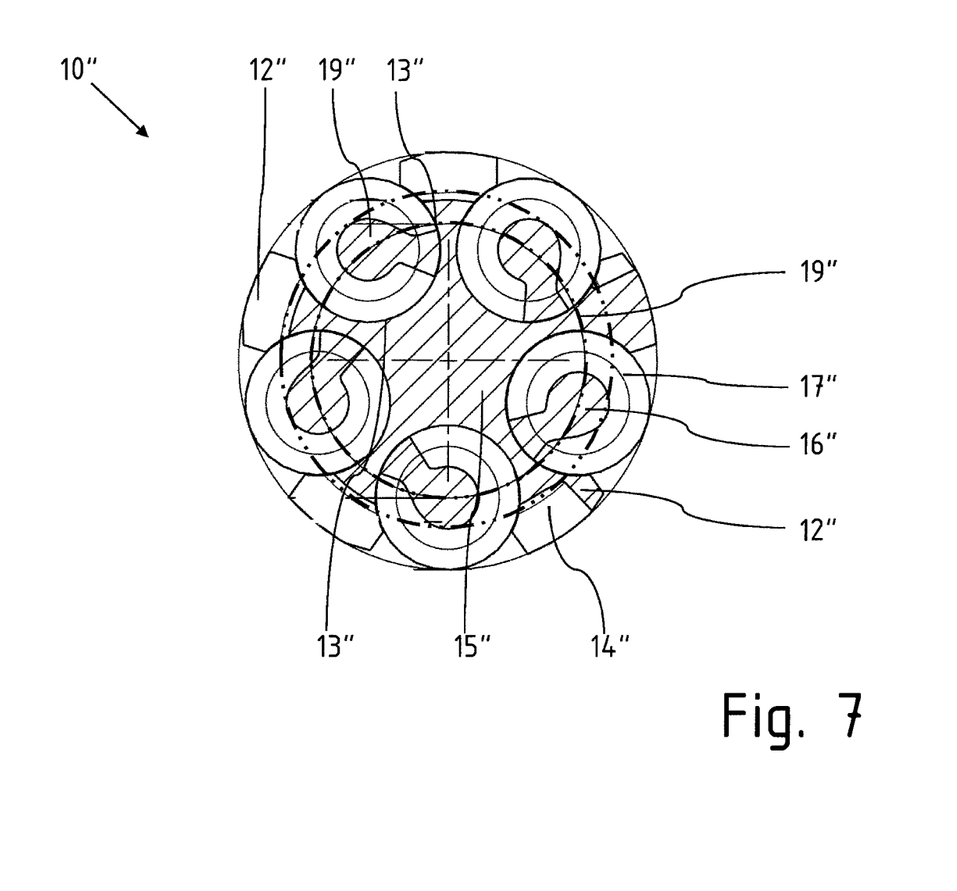
FIG. 7 shows the rotor element of a third embodiment in section.

Milled in on the shaft core 15" of the multi-screw unit 10" illustrated in FIG. 7 are five round receiving grooves 13", which are arranged offset to one another by 72° on a common pitch circle 19". In this example, the pitch circle 19" is smaller than the diameter of the shaft core 15". This achieves a situation in which the cross sections of the respective core regions of the satellite screws 16" lie almost completely within the circumferential line of the rotor shaft core 15"; that is to say the conveying volume in the channel 14" in the main screw flight 12" is almost completely retained and is scarcely constricted by the satellite screws 16".

The flanks of the receiving grooves 13" formed in the rotor shaft core 11" each extend over more than 180°. A degree of enclosure of more than 50% is achieved. As a result, the satellite screws 16" are mounted in a form-fitting manner in the receiving grooves 13". With the remaining proportion of their circumference, the satellite screws 16" lie open within the channel 14" in the main screw flight 12". The satellite screw flights 17" of the satellite screws 16 can therefore effectively loosen up the melt from the base of the channel 14". Since at the same time the satellite screw flights 17" reach to the outer circumference of the main screw flights 12" and rotate in opposite directions, the circulation is particularly effective.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A degassing extruder comprising:
   a housing having an inlet region with an inlet opening, an inner housing recess, a housing opening extending to an outside of the housing, and an outlet region with an outlet opening;
   a multi-screw unit that is rotatably arranged in the inner housing recess and comprises:
   a rotor element with at least one main screw flight which extends over an outer circumference of a rotor shaft core; and
   at least one rotationally driven satellite screw, which is mounted in a receiving groove on the rotor element, the receiving groove extending at least along part of a length of the multi-screw unit,
   wherein, at least in a region of the housing opening:
   the main screw flight has a respective opening recess above the receiving groove for passing through the satellite screw;
   in a cross section of the satellite screw within channels formed by the main screw flight, 40% to 70% of a circumference of the satellite screw is enclosed within the receiving groove in the rotor shaft core, and in a cross section of the satellite screw within the main screw flight, a circumference of the satellite screw is enclosed by both the receiving groove and the main screw flight, such that a degree of enclosure of the cross-section circumference of the satellite screw within the main screw flight is greater than a degree of enclosure of the circumference of the satellite screw within the channels formed by the main screw flight, with the degree of enclosure of the satellite screw within the main screw flight being at most 95%.

2. The degassing extruder as claimed in claim 1, wherein the degree of enclosure of the circumference of the satellite screw within the main screw flight is greater than 50% or the degree of enclosure of the circumference of the satellite screw in the channels formed by the main screw flight is greater than 50%.

3. The degassing extruder as claimed in claim 1, wherein a flight of the satellite screw reaches to an outer circumference of the main screw flight.

4. The degassing extruder as claimed in claim 1, wherein a plurality of the satellite screw are provided and wherein a center axis of each of the plurality of the satellite screw are arranged on a pitch circle which is smaller than a diameter of the rotor shaft core.

5. The degassing extruder as claimed in claim 4, wherein more than 80% of a cross section of a shaft core of the satellite screws is arranged within the circumference of the rotor shaft core.

6. The degassing extruder as claimed in claim 1, wherein a plurality of the satellite screw are provided and wherein at least three of the receiving groove are formed on the rotor element, in each of which one of the plurality of the satellite screw is rotatably mounted.

7. The degassing extruder as claimed in claim 1, wherein a channel depth of the channels of the main screw flight is greater than a maximum channel depth of the receiving groove.

8. The degassing extruder as claimed in claim 1, wherein the satellite screw is driven in rotation in an opposite direction to a direction of rotation of the rotor element and the satellite screw has a flight that is oriented opposite to the main screw flight, such that the flight of the satellite screw is angled in an opposite direction as the main screw flight.

9. The degassing extruder as claimed in claim 1, wherein a diameter D and a pitch t of the main screw flight and an opening width x of the opening recess of the main screw flight are coordinated to one another in such a way that the main screw flight scrapes an entirety of an inner wall of the inner housing recess when the rotor element is rotating.

10. The degassing extruder as claimed in claim 1, wherein a ratio of a flight width d of the main screw flight to a channel width of the channels formed by the main screw flight is less than 1:4.

11. A method for processing a polymer melt by means of a degassing extruder as claimed in claim 1, the method comprising:
  feeding the polymer melt to the rotor element rotatably arranged in the inner housing recess and having the satellite screw;
  surface-area distributing the polymer melt on a circumference of the rotor element and the satellite screw;
  discharging the polymer melt from the rotor element and from the satellite screw to the outlet region; and
  degassing the polymer melt by applying a vacuum to the housing opening,
  wherein the polymer melt distributed on the rotor element is conveyed over a length of the rotor element by the main screw flight arranged on the outer circumference of the rotor shaft core of the rotor element,
  wherein, to loosen up the polymer melt conveyed in the channels formed by the main screw flight, the satellite screw which is arranged in the receiving groove on the rotor element is used,
  wherein a volumetric flow of the polymer melt fed to the multi-screw unit and a volumetric flow of the polymer melt discharged therefrom are coordinated to one another in such a way that adjacent portions of the main screw flight, an outer side of the rotor element and an inner side of the inner housing recess are filled to an extent of less than 100% with the polymer melt.

12. The method as claimed in claim 11, wherein, during the degassing, the channels formed by the main screw flight are filled to an extent of less than 80% with the polymer melt.

* * * * *